US010026119B2

(12) United States Patent
Green et al.

(10) Patent No.: US 10,026,119 B2
(45) Date of Patent: Jul. 17, 2018

(54) EFFICIENT TRANSFER OF FUNDS BETWEEN ACCOUNTS

(75) Inventors: Travis Harrison Kroll Green, New York, NY (US); Narelle Cozens, New York, NY (US); Peter Schmitt, Jersey City, NJ (US); Michael DePasquale, Rutherford, NJ (US); Avery Pennarun, New York, NY (US); Boris Mizhen, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 13/608,834

(22) Filed: Sep. 10, 2012

(65) Prior Publication Data
US 2014/0074709 A1    Mar. 13, 2014

(51) Int. Cl.
*G06Q 40/00* (2012.01)
*G06Q 40/02* (2012.01)

(52) U.S. Cl.
CPC ............. *G06Q 40/02* (2013.01); *G06Q 40/00* (2013.01)

(58) Field of Classification Search
CPC ......... G06Q 20/00; G06Q 40/02; G06Q 40/00
See application file for complete search history.

(56) References Cited

U.S. PATENT DOCUMENTS 5,754,981 A    5/1998  Veeneman
5,987,132 A    11/1999 Rowney
6,297,819 B1   10/2001 Furst
6,850,917 B1   2/2005  Hom et al.
(Continued)

FOREIGN PATENT DOCUMENTS

EP          2357597 A1      8/2011
KR    10-2000-0024321 A     5/2000
(Continued)

OTHER PUBLICATIONS

EP-2357597A1 European Patent.*
(Continued)

*Primary Examiner* — I Jung Liu
(74) *Attorney, Agent, or Firm* — Johnson, Marcou & Isaacs, LLC

(57) ABSTRACT

A transfer management system receives a request to transfer an amount of funds from a transferring account maintained by a transferring bank to a receiving account maintained by a receiving bank. The transfer management system determines whether the transferring bank maintains an intermediate transferring account, and whether the receiving bank maintains an intermediate receiving account. If the transferring bank maintains an intermediate transferring account and the receiving maintains an intermediate receiving account, the transfer management system transmits to a transferring bank system of the transferring bank an intra-bank transfer request. The intra-bank transfer request is to transfer the amount of funds from the transferring account to the intermediate transferring account. Additionally, the transfer management system transmits an intra-bank transfer request to a receiving bank system of the receiving bank to transfer the amount of funds from the intermediate receiving account maintained by the receiving bank to the receiving account.

16 Claims, 6 Drawing Sheets

(56) References Cited

U.S. PATENT DOCUMENTS

| | | | |
|---|---|---|---|
| 6,868,393 B1 | 3/2005 | Demsky et al. | |
| 6,876,977 B1 | 4/2005 | Marks | |
| 7,051,002 B2 | 5/2006 | Keresman, III et al. | |
| 7,433,845 B1 | 10/2008 | Flitcroft et al. | |
| 7,647,247 B2 | 1/2010 | Abraham et al. | |
| 8,145,569 B2 | 3/2012 | Gong | |
| 8,332,317 B1 | 12/2012 | McCoy et al. | |
| 8,417,638 B2 | 4/2013 | Gong | |
| 8,452,702 B1* | 5/2013 | O'Donnell | G06Q 40/02 705/35 |
| 8,589,289 B1* | 11/2013 | O'Donnell et al. | 705/39 |
| 8,595,059 B1 | 11/2013 | Huang | |
| 9,483,775 B1 | 11/2016 | Kim et al. | |
| 9,826,012 B2 | 11/2017 | Hao et al. | |
| 2002/0128877 A1* | 9/2002 | Levit | G06Q 40/08 705/4 |
| 2003/0130858 A1 | 7/2003 | Pickover et al. | |
| 2003/0236726 A1* | 12/2003 | Almonte et al. | 705/35 |
| 2004/0138937 A1 | 7/2004 | Hahn-Carlson | |
| 2005/0065881 A1 | 3/2005 | Li | |
| 2005/0108153 A1 | 5/2005 | Thomas et al. | |
| 2006/0036537 A1* | 2/2006 | Lawrence et al. | 705/39 |
| 2006/0173776 A1 | 8/2006 | Shalley et al. | |
| 2006/0235789 A1 | 10/2006 | Koch | |
| 2007/0198432 A1* | 8/2007 | Pitroda et al. | 705/64 |
| 2007/0233603 A1 | 10/2007 | Schmidgall et al. | |
| 2007/0299736 A1 | 12/2007 | Perrochon et al. | |
| 2008/0015988 A1 | 1/2008 | Brown et al. | |
| 2008/0052224 A1* | 2/2008 | Parker | 705/38 |
| 2008/0189189 A1 | 8/2008 | Morgenstern | |
| 2008/0313047 A1 | 12/2008 | Casares et al. | |
| 2009/0043705 A1 | 2/2009 | Bishop et al. | |
| 2009/0150266 A1 | 6/2009 | Dickelman | |
| 2009/0204510 A1 | 8/2009 | Hwang | |
| 2010/0017328 A1 | 1/2010 | Stephen et al. | |
| 2010/0191622 A1* | 7/2010 | Reiss et al. | 705/30 |
| 2011/0040683 A1 | 2/2011 | Understein | |
| 2011/0106698 A1 | 5/2011 | Isaacson et al. | |
| 2012/0150727 A1* | 6/2012 | Nuzzi et al. | 705/39 |
| 2012/0179577 A1 | 7/2012 | Isaacson et al. | |
| 2012/0238242 A1* | 9/2012 | Hirson et al. | 455/406 |
| 2012/0290482 A1* | 11/2012 | Atef et al. | 705/44 |
| 2013/0311370 A1 | 11/2013 | Gong | |
| 2014/0108250 A1 | 4/2014 | Balasubramanian et al. | |

FOREIGN PATENT DOCUMENTS

| | | | |
|---|---|---|---|
| KR | 10-2001-0086646 A | 9/2001 | |
| KR | 10-2002-0009761 A | 2/2002 | |
| KR | 10-2002-0088337 A | 11/2002 | |
| KR | 10-2007-0013048 A | 1/2007 | |
| WO | 2009/076103 A2 | 6/2009 | |
| WO | 2014/039357 A1 | 3/2014 | |

OTHER PUBLICATIONS

Oz Shy, Person-to-Person Electronic Funds Transfers: Recent Developments and Policy Issues, Mar. 2, 2010, Federal Reserve bank of Boston, web, 1-30 (Year: 2010).*

Bilton, N., "Venmo Wants Its Users to Trust Each Other," Bits, The New York Times, Oct. 25, 2010, 8 pages, [Online] [Retrieved on Mar. 20, 2012] Retrieved from the Internet<URL:http://bits.blogs.nytimes.com/2010/10/25/venmo-wants-its-users-to-trust-each-other/>.

Gannes, L., "Venmo's Simple, Loaded Premise: Pay Your Friends From Your Phone," GigaOM, Feb. 16, 2010, 10 pages, [Online] [Retrieved on Mar. 20, 2012] Retrieved from the Internet<URL:http://gigaom.com/2010/02/16/venmos-simple-loaded-premise-pay-your-friends-from-your-phone/>.

Kopfer, M.C., "Understanding Bank Wire Transfer and Instructions," Yahoo! Inc., Aug. 14, 2008, 3 pages, [Online] Retrieved from the Internet<URL:voices.yahoo.com/understanding-bank-wire-transfers-instructions-1810193.html>.

Marquit, M., "Difference Between Wire Transfer and ACH," DepositAccounts.com, Sep. 10, 2012, 2 pages, [Online] Retrieved from the Internet<URL:www.depositaccounts.com/blog/difference-between-wire-tranfer-and-ach.html>.

Schonfeld, E., "Social Payment Startup Venmo Raised $1.2 Million and Has a New iPhone App (TCTV)," AOL Inc., Sep. 16, 2010, 2 pages, [Online] [Retrieved on Mar. 20, 2012] Retrieved from the Internet<URL:http://techcrunch.com/2010/09/16/venmo-1-2-million-iphone/>.

PCT International Search Report and Written Opinion for PCT/US2013/057172, dated Dec. 12, 2013, 9 Pages.

U.S. Appl. No. 13/839,563 to Gong filed Mar. 15, 2013.

Anderson, "Office Action issued in copending U.S. Appl. No. 13/271,284, filed Oct. 12, 2011", dated Dec. 5, 2012, 1-28.

Fields, "Office Action issued in co-pending U.S. Appl. No. 11/956,075, filed Dec. 13, 2007", dated Jan. 8, 2010, 1-12.

Fields, "Office Action issued in co-pending U.S. Appl. No. 11/956,075, filed Dec. 13, 2007", dated Jan. 12, 2009, 1-11.

Fields, "Office Action issued in co-pending U.S. Appl. No. 11/956,075, filed Dec. 13, 2007", dated Feb. 16, 2011, 1-12.

Fields, "Office Action issued in co-pending U.S. Appl. No. 11/956,075, filed Dec. 13, 2007", dated Jun. 1, 2010, 1-10.

Fields, "Office Action issued in co-pending U.S. Appl. No. 11/956,075, filed Dec. 13, 2007", dated Jun. 15, 2009, 1-12.

Nguyen, "Office Action issued in copending U.S. Appl. No. 13/829,765, filed Mar. 14, 2013", dated Jul. 31, 2014, 1-17.

Unknown, "Kohls Deleted My Wedding Registry", Planetfeedback: planetfeedback.com/index.php?level2=blog_viewpost &topic_id=294170 &reply_id=81913, 1-9.

Unknown, "Ward Catalogue No. 13, Montgomery Ward & Co.,", archive.org/details/catalogueno13spr00mont, 1875, 1-78.

Nguyen, "Office Action issued in copending U.S. Appl. No. 13/829,765, filed Mar. 14, 2013", dated Jul. 8, 2015, 1-9.

Fields, "Office Action issued in co-pending U.S. Appl. No. 13/839,563, filed Mar. 15, 2013", dated Dec. 23, 2014, 1-13.

Nguyen, "Final Office Action issued in copending U.S. Appl. No. 13/829,765", dated Feb. 25, 2015, 1-7.

Baharlou, "International Preliminary Report on Patentability issued in International Application No. PCT/US2013/057172", dated Mar. 19, 2015, 8 pages.

Fields, "U.S. Office Action issued in copending U.S. Appl. No. 13/839,563, filed Mar. 15, 2013", dated Feb. 24, 2016, 17 pages.

Fields, "U.S. Office Action issued in copending U.S. Appl. No. 13/839,563, filed Mar. 15, 2013", dated Jun. 15, 2016, 19 pages.

Nguyen, "U.S. Office Action issued in copending U.S. Appl. No. 13/829,765, filed Mar. 14, 2013", dated Jan. 19, 2016, 15 pages.

Nguyen, "U.S. Office Action issued in copending U.S. Appl. No. 13/829,765, filed Mar. 14, 2013", dated May 17, 2016, 15 pages.

U.S. Appl. No. 13/829,765 to Zheng et al. filed Mar. 14, 2013.

Jang, "International Search Report and Written Opinion issued in International Application No. PCT/US2008/085275", dated Jun. 29, 2017, 11 pages.

Nguyen, "U.S. Office Action issued in copending U.S. Appl. No. 13/829,765, filed Mar. 14, 2013", dated Sep. 7, 2017, 14 pages.

Nickitas-Etienne, "International Preliminary Report on Patentability issued in International Application No. PCT/US2008/085275", dated Jul. 13, 2017, 9 pages.

Fields, "U.S. Office Action issued in copending U.S. Appl. No. 13/839,563, filed Mar. 15, 2013", dated Dec. 28, 2016, 17 pages.

Fields, "U.S. Office Action issued in copending U.S. Appl. No. 13/839,563, filed Mar. 15, 2013", dated Jul. 3, 2017, 17 pages.

Nyugen, "U.S. Office Action issued in copending U.S. Appl. No. 13/829,765, filed Mar. 14, 2013", dated Nov. 29, 2016, 22 pages.

Anderson, "U.S. Office Action issued in copending U.S. Appl. No. 13/839,563, filed Mar. 15, 2013", dated Mar. 12, 2018, 20 pages.

Chen, et al., "Empowering collaborative commerce with Web Services enabled business process management systems", ScienceDirect, Decision Support Systems, vol. 43, 2007, pp. 530-546.

Endrei, et al., "Patterns:Service-Oriented Architecture and Web Services", ibm.com/redbooks, Apr. 2004, 370 pages.

Hansen, et al., "Web Services: An Architectural Overview", Internet Citation, Nov. 7, 2002, 14 pages.

(56) References Cited

OTHER PUBLICATIONS

Vassil, "European Search Report issued in European Application No. 08859940.0", dated Apr. 6, 2018, 6 pages.
Nguyen, "U.S. Office Action issued in copending U.S. Appl. No. 13/829,765 filed on Mar. 14, 2013", dated Apr. 16, 2018, 19 pages.

* cited by examiner

EFFICIENT TRANSFER OF FUNDS BETWEEN ACCOUNTS

BACKGROUND

1. Field of the Invention

This invention pertains in general to bank accounts and more specifically to managing the transfer of funds between accounts.

2. Description of the Related Art

Many banks to allow their customers to electronically transfer funds between accounts. A person may electronically transfer funds from their account to the account of another person, for example, as a gift or to settle a debt. Transferring funds between accounts at the same bank is typically free and happens quickly because only one bank is involved in the transfer. However, electronically transferring funds between accounts at different banks has some drawbacks.

One way of electronically transferring funds between banks is through a wire transfer. Through a wire transfer, funds are transferred almost instantaneously. A drawback of wire transfers is that they are costly because typically both the sender and the receiver of funds have to pay a large fee. Another way of electronically transferring funds between banks is through a clearing house, such as the Automated Clearing House (ACH). Transfers through a clearing house are usually free or have a small fee associated with them. However, these types of transfers typically take 1-3 days to be completed because several entities are involved and clearing house transfers are handled in batches. Moreover, an ACH transfer may be rejected up to 60 days later.

BRIEF SUMMARY

Methods, computer program products, and computer systems are described for processing fund transfer requests. Embodiments of the method comprise a transfer management system receiving a request to transfer an amount of funds from a transferring account maintained by a transferring bank to a receiving account maintained by a receiving bank. The transfer management system determines whether the transferring bank maintains an intermediate transferring account, and whether the receiving bank maintains an intermediate receiving account. If the transferring bank maintains an intermediate transferring account and the receiving maintains an intermediate receiving account, the transfer management system transmits to a transferring bank system of the transferring bank an intra-bank transfer request. The intra-bank transfer request is to transfer the amount of funds from the transferring account to the intermediate transferring account. Additionally, the transfer management system transmits an intra-bank transfer request to a receiving bank system of the receiving bank to transfer the amount of funds from the intermediate receiving account maintained by the receiving bank to the receiving account.

Embodiments of the computer program product have a non-transitory computer-readable storage medium having computer executable instructions. The computer executable instructions comprise an authorization module configured to receive a request to transfer an amount of funds from a transferring account maintained by a transferring bank to a receiving account maintained by a receiving bank. A transfer module is configured to determine whether the transferring bank maintains an intermediate transferring account, and whether the receiving bank maintains an intermediate receiving account. If the transferring bank maintains an intermediate transferring account and the receiving maintains an intermediate receiving account, the transfer module is configured to transmit to a transferring bank system of the transferring bank an intra-bank transfer request. The intra-bank transfer request is to transfer the amount of funds from the transferring account to the intermediate transferring account. Additionally, the transfer module is configured to transmit an intra-bank transfer request to a receiving bank system of the receiving bank to transfer the amount of funds from the intermediate receiving account maintained by the receiving bank to the receiving account.

Embodiments of the computer system comprise a computer processor and a computer-readable storage medium storing computer program module configured to execute on the computer processor. The computer program modules comprise an authorization module configured to receive a request to transfer an amount of funds from a transferring account maintained by a transferring bank to a receiving account maintained by a receiving bank. A transfer module is configured to determine whether the transferring bank maintains an intermediate transferring account, and whether the receiving bank maintains an intermediate receiving account. If the transferring bank maintains an intermediate transferring account and the receiving maintains an intermediate receiving account, the transfer module is configured to transmit to a transferring bank system of the transferring bank an intra-bank transfer request. The intra-bank transfer request is to transfer the amount of funds from the transferring account to the intermediate transferring account. Additionally, the transfer module is configured to transmit an intra-bank transfer request to a receiving bank system of the receiving bank to transfer the amount of funds from the intermediate receiving account maintained by the receiving bank to the receiving account.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
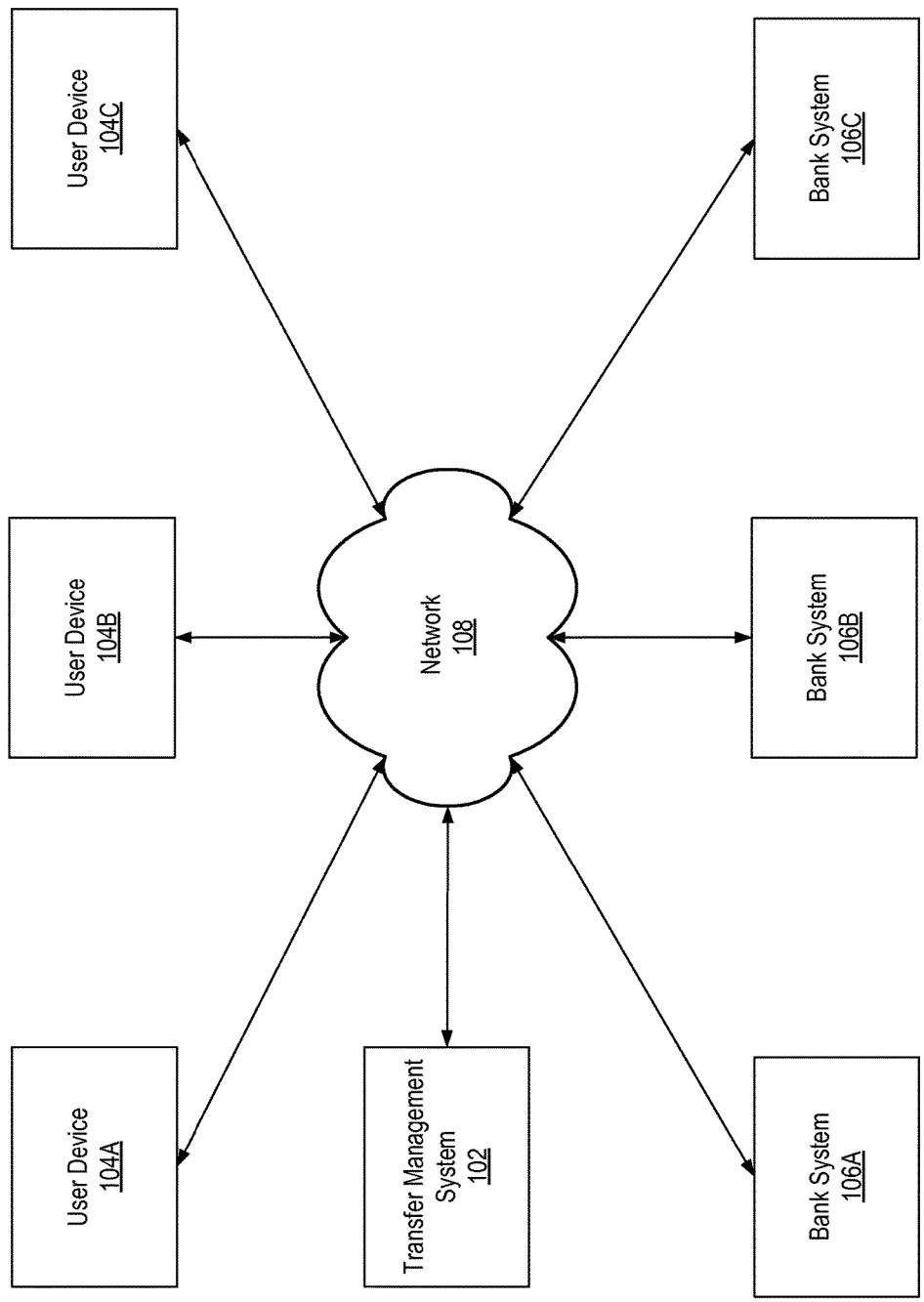
FIG. 1 is a high-level block diagram of a fund transfer environment according to one embodiment.

FIG. 1 is a high-level block diagram of a fund transfer environment 100 according to one embodiment. FIG. 1 illustrates a transfer management system 102, three user devices 104, and three bank systems 106 connected via a network 108. Although the illustrated environment 100 includes only a select number of each entity, other embodiments can include more or less of each (e.g., more user devices 104 and bank systems 106).

FIG. 1 uses like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral (e.g. "104" in the text refers to reference numerals "104A," "104B," and/or "104C" in the figures).

The transfer management system 102 manages the electronic transfer of funds between accounts of the bank systems 106. In one embodiment, the transfer management system 102 is independent from the bank systems 106 in that it is not part of a bank and is run by a third party entity. The transfer management system 102 uses intermediate accounts opened at different banks to allow users to quickly transfer funds between accounts at different banks. An intermediate account is an account opened, managed, and funded by an administrative entity of the system 102 for purposes of allowing users to quickly transfer funds between accounts. In one embodiment, intermediate accounts are opened at banks that are popular among users (i.e., at banks where a large number of users have accounts).

When a user requests to electronically transfer an amount of funds from his/her account at a bank (i.e., a transferring account maintained by a transferring bank) to an account at another bank (i.e., a receiving account maintained by a receiving bank), the transfer management system 102 determines whether intermediate accounts exist at both banks. If intermediate accounts exist at both banks, the transfer management system 102 communicates with a bank system 106 of the transferring bank to complete an electronic transfer of the amount of funds from the transferring account to an intermediate account at the transferring bank. Additionally, the transfer management system 102 communicates with a bank system 106 of the receiving bank to complete an electronic transfer of the amount of funds from an intermediate account at the receiving bank to the receiving account.

Since the transfers that occur based on the request of the user are intra-bank transfers (i.e., each fund transfer is within a bank), the receiving account receives the funds in a fast manner. Additionally, the overall cost of transferring the funds to the receiving bank is small since most banks charge only a small fee or no fee at all for intra-bank transfers. Therefore, the transfer management system 102 supports an environment where funds must be quickly and verifiably transferred among accounts at various banks.

An example of such an environment is where multiple people engage in an event/transaction and as a result of the event/transaction one person owes another person money. For example, assume that three friends eat dinner at a restaurant and one of the friends pays the bill with a debit card because the restaurant does not permit bill splitting. While still at the restaurant, each of the non-paying friends can communicate with the transfer management system 102 using a mobile user device 104 and request a transfer of funds from their bank account to the bank account of the paying friend to pay back the friend for dinner. Through the transfer management system 102 and the use of intermediate accounts, the money owed can be deposited in the bank account of the paying friend before leaving the restaurant even if the friends have bank accounts at different banks.

A user device 104 is an electronic device used by a user to communicate with the entities connected to the network 108. Through a device 104 a user can communicate with the transfer management system 102 to request the transfer of funds between accounts. A user device 104 may be, for example, a mobile phone, tablet computer, notebook computer, desktop computer, or personal digital assistant (PDA). In one embodiment, a user device 104 may connect to the network 108 via wireless or wired connections.

The bank systems 106 represent the electronic systems of banks. A bank is a financial institution that provides financial services. A type of financial service provided by banks is to allow users to open accounts in which funds can be deposited and/or withdrawn. The types of accounts that may be opened by users with a bank may include, for example, savings, checking, credit, certificate of deposit, and money market accounts.

In one embodiment, each bank system 106 includes an electronic interface (e.g., an application programming interface) that allows the transfer management system 102 to communicate with the bank system 106. Through the electronic interface the transfer management system 102 can, for example, request electronic transfers of funds between bank accounts, request information of bank accounts (e.g., balance information), and request verification of information (e.g., whether a user is authorized to transfer funds from an account and whether an account number is valid).

When a system 106 of a bank receives a request from the transfer management system 102 to electronically transfer funds between an account with the bank and another account, the bank system 106 verifies the user that initiated the request is authorized to make such a request. If the user is authorized, the bank system 106 determines whether the transferring account has sufficient funds for the transfer. If the transferring account does not have sufficient funds, the bank system 106 denies the request. On the other hand, if sufficient funds are available, the bank system 106 determines whether requested transfer is an intra-bank transfer (i.e., the receiving account is at the same bank as the transferring account) or an inter-bank transfer (i.e., the receiving account is at a different bank than the transferring account).

If the transfer is an intra-bank transfer, the bank system 106 completes the transfer and updates balances of the two accounts to reflect the completion of the transfer. On the other hand, if the transfer is inter-bank transfer, the bank system 106 can process the request in different ways depending on the request. In one embodiment, if it was requested that the transfer be completed via a wire transfer, the bank system 106 communicates directly with the corresponding bank system 106 of the receiving account to request that it complete the transfer. The bank system 106 of the receiving account confirms the transfer. In one embodiment, if it was requested that the transfer be completed via a clearing house, the bank system 106 batches the inter-bank transfer request with other transfer requests and transmits the batch to a clearing house. The clearing house communicates with the appropriate bank system 106 to complete the transfer.

In one embodiment, the bank systems 106 provide the transfer management system 102 with information about user accounts. In one embodiment, when a bank system 106 receives from the transfer management system 102 a request for information about the account of a user, the bank system 106 determines whether the user has authorized the transfer management system 102 to receive account information. If the user has authorized the transfer management system 102 to receive account information, the bank system 106 provides the requested information to the transfer management system 102. The type of account information that may be provided by a bank system 106 to the transfer management system 102 may include, for example, balance information, recent transactions, and pending transactions.

The network 108 represents the communication pathways between the transfer management system 102, the user devices 104, and the bank systems 106. In one embodiment, the network 108 is the Internet and uses standard communications technologies and/or protocols. Thus, the network 108 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 108 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. In another embodiment, the entities can use custom and/or dedicated data communications technologies instead of, or in addition to, the ones described above.

Figure 2:
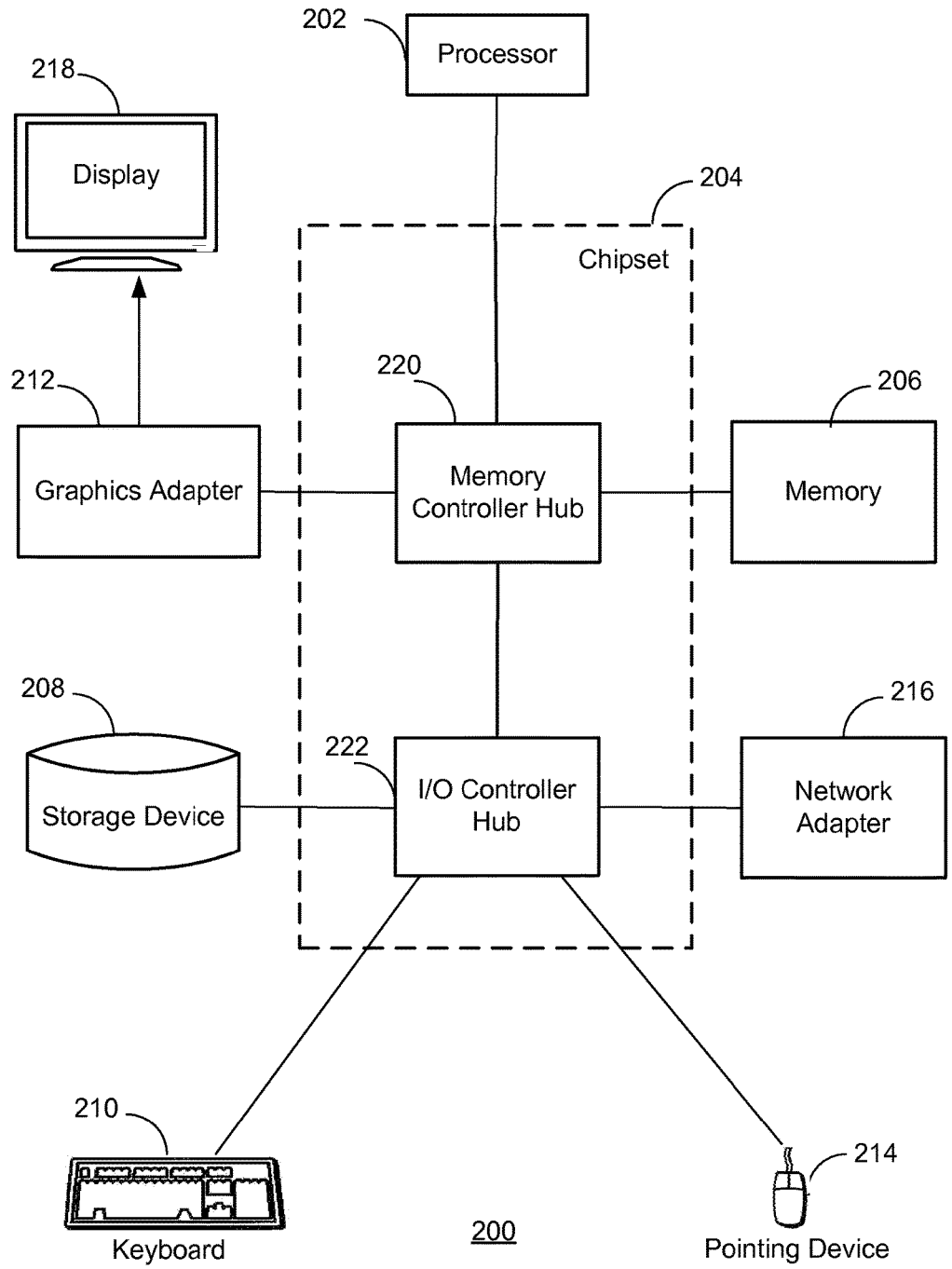
FIG. 2 is a high-level block diagram illustrating a functional view of a typical computer system for use as one of the entities illustrated in the environment of FIG. 1 according to one embodiment.

FIG. 2 is a high-level block diagram illustrating a functional view of a typical computer system 200 for use as one of the entities illustrated in the environment 100 of FIG. 1 according to an embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 108. Some embodiments of the computer system 200 have different and/or other components than those shown in FIG. 2.

The computer 200 is adapted to execute computer program modules for providing the functionality described herein. As used herein, the term "module" to refers to computer program instruction and other logic for providing a specified functionality. A module can be implemented in hardware, firmware, and/or software. A module is typically stored on the storage device 208, loaded into the memory 206, and executed by the processor 202.

A module can include one or more processes, and/or be provided by only part of a process. Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The types of computer systems 200 used by the entities of FIG. 1 can vary depending upon the embodiment and the processing power used by the entity. For example, a user device 104 that is a mobile phone typically has limited processing power, a small display 218, and might lack a pointing device 214. The transfer management system 102 and financial systems 106, in contrast, may comprise multiple blade servers working together to provide the functionality described herein.

Figure 3:
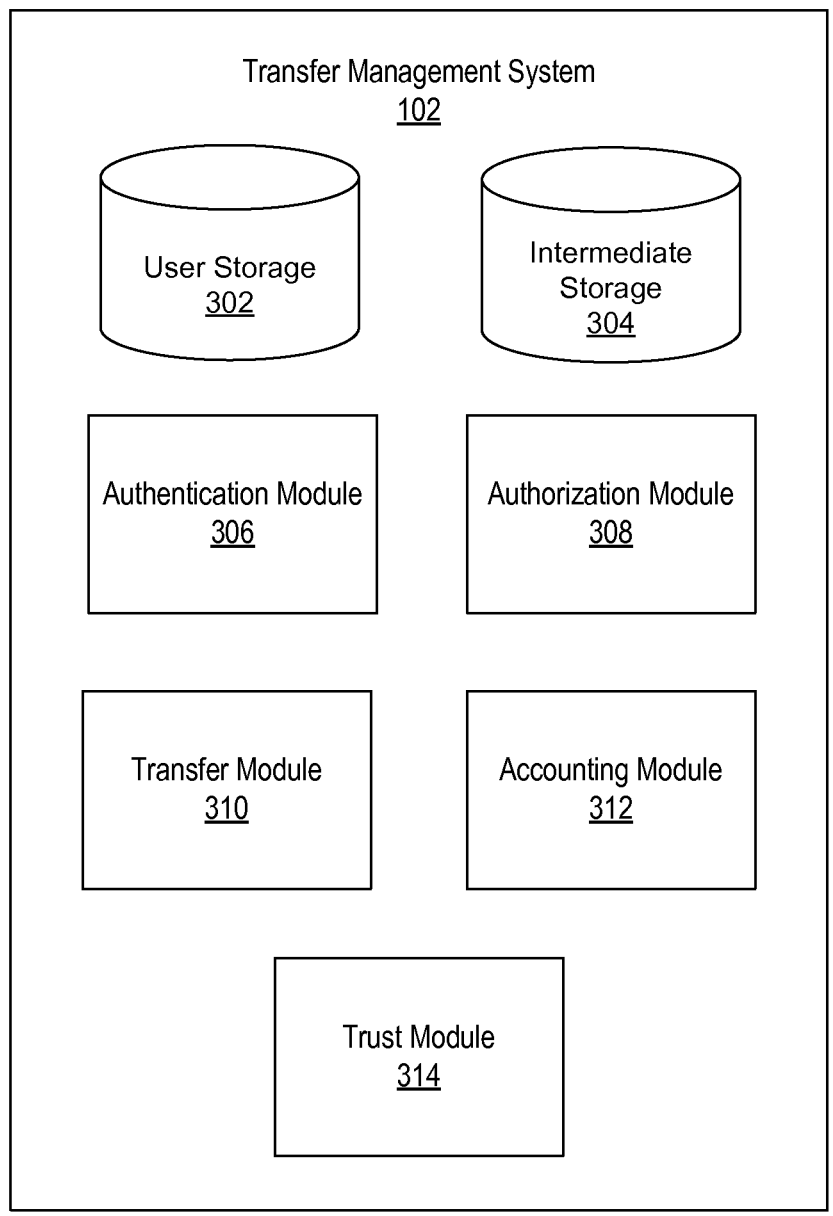
FIG. 3 is a high-level block diagram illustrating modules within a transfer management system according to one embodiment.

FIG. 3 is a high-level block diagram illustrating modules within the transfer management system 102 according to one embodiment. The transfer management system 102 includes a user storage 302, intermediate storage 304, authentication module 306, authorization module 308, transfer module 310, accounting module 312 and trust module 314. Those of skill in the art will recognize that other embodiments can have different and/or other modules than the ones described here, and that the functionalities can be distributed among the modules in a different manner.

The user storage 302 stores information about users that have signed up (i.e., registered) to use the services provided by the transfer management system 102. In one embodiment, for each registered user, the user storage 302 stores personal information about the user (e.g., name, address, phone number) and authentication information used by the user to log into the system 102. Authentication information may include, for example, a user identifier and password.

In one embodiment, for each registered user, the user storage 302 stores a trust score of the user. The trust scores are determined and updated by the trust module 314 as described below. The trust score of a user indicates the relative trust that the transfer management system 102 has that the user is financially responsible and will not make fraudulent transfer requests.

In one embodiment, for each registered user, the user storage 302 stores account information describing one or more bank accounts identified by the user for transferring funds. For example, a user may provide information about each of his or her most active bank accounts, as well as bank accounts of other users to which the user frequently transfers funds. Account information about a bank account may include one or more of the following: the name of the bank having the account, a routing transit number of the bank, a type of the account, a name provided by the user for the account, an account number, a balance of the account, and authentication information needed to access account information from the bank (e.g., login information of the user for a website of the bank).

The intermediate storage 304 stores account information describing intermediate accounts. As described above, an intermediate account is a bank account opened, managed, and initially funded by an administrative entity of the transfer management system 102. Intermediate accounts are opened by the administrative entity at a variety of banks for purposes of allowing users to quickly transfer funds between accounts at different banks. In one embodiment, intermediate accounts are opened at select banks at which a large number of users have bank accounts.

In one embodiment, the intermediate storage 304 stores account information for each intermediate account. In one embodiment, the intermediate storage 304 stores at least one balance for each intermediate account. The balance of an intermediate account is updated by the accounting module 312 as described below. In one embodiment, the intermediate storage 304 stores an ideal fund range for each intermediate account. The ideal fund range of an intermediate account is a range within which the amount of funds of the account should be in order to be able to complete majority of the inter-bank transfers requested by users. The accounting module 312 updates that the stored fund ranges as described below.

The authentication module 306 authenticates users of the transfer management system 102. In one embodiment, when a user attempts to communicate with the transfer management system 102, if the user is not logged into the system 102, the authentication module 306 presents a login page to the user via a device 104 of the user. In the login page, a user that has previously signed up with the system 102 can enter their respective authentication information. When the authentication information is entered, the authentication module 306 verifies that information provided corresponds to the information stored in the user storage 302. If the authentication module 306 is able to verify the authentication information entered, the user is logged into the transfer management system 102. In another embodiment, the user is automatically logged into the system 102 by the device 104.

In one embodiment, if a user is communicating with the transfer management system 102 and has not previously signed up with the transfer management system 102, the authentication module 306 presents the user with option of signing up to use the services of the system 102. If the user requests to sign up, the user goes through a sign up process. During the sign up process, the user provides authentication information that user wishes to use to login, as well as personal information.

In one embodiment, during the sign up process the user can provide account information about one or more bank accounts from which the user may wish to transfer funds to or from in the future (i.e., add one or more bank accounts for transferring funds). In one embodiment, when an account of the user is added, the user also provides the transfer management system 102 with authorization to access account information from the bank maintaining the account and/or authorization to communicate with the bank to initiate fund transfers from the account. The account information received by the authentication module 306 for each account added by the user is stored in the user storage 302.

The authorization module 308 authorizes transfer requests received from users. In one embodiment, a request to transfer funds received from a user device 104 includes at least information as to the transferring account (bank account from which funds will be withdrawn), the receiving account (bank account in which the funds will be deposited), and an amount of funds to transfer. In one embodiment, a user makes the request by completing and submitting a fund transfer form including the information described.

When a fund transfer request is received from a user device 104, the authorization module 308 determines whether to authorize the request. In one embodiment, to determine whether to authorize the request, the authorization module 308 verifies that the information provided for the transferring and receiving accounts is accurate (e.g., accounts numbers are accurate), that the user making the request is authorized by the transferring bank (bank having the transferring account) to request the withdrawal of funds from the account, and that the transferring account has sufficient funds for the transfer. In one embodiment, the authorization module 308 communicates with the bank systems 106 of the transferring bank and the receiving bank (bank having the receiving account) to obtain the proper information to make the verification.

If the authorization module 308 determines that the information of an account is inaccurate, that the user is not authorized to make the request, or that the transferring account does not have sufficient funds for the transfer, the authorization module 308 denies the request. The authorization module 308 transmits a message to the user device 104 notifying the user that the transfer request has been denied. On the other hand, if the authorization module 308 verifies that the account information is accurate, that the user is authorized, and that there are sufficient funds, the authorization module 308 authorizes the request. The authorization module 308 forwards the authorized fund transfer request to the transfer module 310 for processing.

The transfer module 310 processes fund transfer requests by users. When the transfer module 310 receives an authorized fund transfer request of a user from the authorization module 308, the transfer module 310 determines whether transfer request is for an intra-bank transfer or an inter-bank transfer. If the request is for an intra-bank transfer, the transfer module 310 forwards the transfer request to the bank system 106 of the transferring bank. The transferring bank system 106 processes the intra-bank transfer request by moving funds between the accounts maintained by the bank.

On the other hand, if the request is for an inter-bank transfer, the transfer module 310 analyzes the intermediate storage 304 to determine whether intermediate accounts exists at both the transferring bank and receiving bank. The transfer module 310 processes the inter-bank transfer request based on whether an intermediate account exists at the transferring and receiving banks. If an intermediate account does not exist at the transferring bank or at the receiving bank, the transfer module 310 transmits a request to the transferring bank system 106 to complete the electronic transfer of funds between the transferring account and the receiving account (i.e., an inter-bank transfer request). In this embodiment, the transfer is completed without intermediate accounts since no intermediate accounts exist at the two banks involved. In one embodiment, the transfer is completed via a clearing house, such as the Automated Clearing House (ACH).

If the transfer module 310 determines that at least one intermediate account exists at the transferring bank and at least one intermediate account exists at the receiving bank, the transfer module 310 determines whether the intermediate account at the receiving bank has sufficient funds to transfer the amount of funds to the receiving account. In one embodiment, the transfer module 310 determines whether the intermediate account at the receiving bank has sufficient funds based on the balance of the account in the intermediate storage 304. In one embodiment, the transfer module 310 requests that the accounting module 312 update the balance prior to making the determination.

If the intermediate account at the receiving bank has sufficient funds, the transfer module 310 transmits a request to the transferring bank system 106 to transfer the amount of funds from the transferring account to the intermediate account at the transferring bank (i.e., an intra-bank transfer request). The transfer module 310 additionally sends a request to the receiving bank system 106 to transfer the amount of funds from the intermediate account at the receiving bank to the receiving account (i.e., an intra-bank transfer request). In one embodiment, the transfer module 310 waits until the intermediate account at the transferring bank has electronically received the funds before sending the request to the receiving bank system 106. Waiting until the intermediate account at the transferring bank has received the funds protects the transfer management system 102 from suffering a loss if the transfer to the intermediate account fails.

In one embodiment, the transfer module 310 also sends a request to the transferring bank system 106 to transfer the amount of funds from the intermediate account at the transferring bank to the intermediate account at the receiving bank. In one embodiment, the transfer between the two intermediate accounts is completed via a clearing house to keep cost low. The transfer between the two intermediate accounts helps prevent the intermediate account at the receiving bank from becoming depleted of funds. In another embodiment, transfer module 310 initiates a transfer of the amount of funds between the two intermediate accounts only if the balance of the intermediate account at the receiving bank is below a certain value.

In one embodiment, if the intermediate account at the receiving bank does not have a sufficient amount of funds for the transfer to the receiving account, the transfer module 310 waits until the account has sufficient funds to proceed with the transfers (i.e., the transfer module 310 periodically inquires whether the account has sufficient funds until the account has the funds). The account may be replenished, for example, by other user transfers and/or by an administrative entity of the transfer management system 102. In another embodiment, the transfer module 310 waits for a set period of time. After the set period of time, if the account still does not have sufficient funds, the transfer module 310 transmits a request to the transferring bank system 106 to transfer the funds between the transferring and receiving accounts. In other words, after the set period of time, if the intermediate account still does not have sufficient funds, the transfer is completed without intermediate accounts.

In another embodiment, if the intermediate account at the receiving bank does not have sufficient funds, the transfer module 310 automatically transmits a request to the transferring bank system 106 to complete the transfer between the transferring account and the receiving account. In this embodiment, the transfer is automatically completed without intermediate accounts if the intermediate account at the receiving bank does not have sufficient funds.

If the transfer module 310 determines that the transferring bank has at least one intermediate account, but the receiving bank does not have an intermediate account, the transfer module 310 transmits a request to the transferring bank system 106 to transfer the amount of funds from the transferring account to an intermediate account at the transferring bank (an intra-bank transfer request). In one embodiment, once the intermediate account has electronically received the funds, the transfer module 310 transmits a request to the transferring bank system 106 to transfer the amount of funds from the intermediate account at the transferring bank to the receiving account at the receiving bank (i.e., inter-bank transfer request). In one embodiment, the transfer to the receiving bank is completed via a clearing house.

Although the receiving account will not receive the funds as fast as if the transfer were completed to the receiving account via an intra-bank transfer, the transfer management system 102 can guarantee the user of the receiving account that he or she will receive the funds. The transfer management system 102 can make the guarantee since it already received the funds from the transferring account. In one embodiment, once the intermediate account at the transferring bank receives the funds from transferring bank, the transfer module 310 transmits a message to the user of the receiving account notifying the user that transfer management system 102 guarantees that the user will receive the amount of funds within a certain time period. The message may be transmitted, for example, to an email address of the user or to a mobile device 104 of the user.

The guarantee is beneficial, for example, in a scenario where the transfer between the accounts is to provide payment for the purchase of an item. For example, assume that a buyer purchases from a seller an item that needs to be shipped to the buyer. To pay the seller, the buyer initiates with the transfer management system 102 a fund transfer from a transferring account of the buyer to a receiving account of the seller. Once an intermediate account at the transferring bank receives the funds from the transferring account and a guarantee message is transmitted to the buyer, the buyer can feel comfortable shipping the item to the seller without the funds yet being deposited in the receiving account.

If the transfer module 310 determines that the transferring bank does not have any intermediate accounts, but the receiving bank has at least one intermediate account, the transfer module 310 determines whether the user that requested the transfer of funds is a trusted user. In one embodiment, the transfer module 310 determines that the user is a trusted user if a trust score of the user in the user storage 302 is above a threshold.

If the user is not a trusted user, the transfer module 310 transmits a request to the transferring bank system 106 to transfer the amount of funds from the transferring account to the receiving account (e.g., an inter-bank transfer request via a clearing house). On the other hand, if the user is a trusted user, the transfer module 310 determines whether an intermediate account at the receiving bank has sufficient funds to transfer the amount of funds in the user request from the intermediate account to the receiving account.

If the intermediate account does not have sufficient funds, the transfer module 310 proceeds as described above. Conversely, if the intermediate account has sufficient funds, the transfer module 310 transmits a request to the transferring bank system 106 to transfer the amount of funds from the transferring account to the intermediate account at the receiving bank (e.g., an inter-bank transfer request via a clearing house). Additionally, the transfer module 310 transmits a request to the receiving bank system 106 to transfer the amount of funds from the intermediate account to the receiving account (i.e., an intra-bank transfer request). Therefore, even though the funds may not yet have been received by the intermediate account from transferring account, the transfer management system 102 lends the user the funds so they can quickly be deposited in the receiving account.

The accounting module 312 maintains the balances and ideal fund ranges of intermediate accounts in the intermediate storage 304. In one embodiment, when the transfer module 310 transmits a request to a bank system 106 to transfer an amount of funds to or from an intermediate account, the accounting module 312 updates the balance of the intermediate account in the intermediate storage 304 according to the request.

In one embodiment, the accounting module 312 maintains the balances of intermediate accounts in the intermediate storage 304 based on balance information received from the bank system 106. In one embodiment, for each intermediate account in the storage 304, the accounting module 312 periodically communicates with the system 106 of the bank maintaining the intermediate account and obtains balance information of the account. The accounting module 312 updates the balance of the account in the intermediate storage 304 based on balance information received. In one embodiment, upon request by the transfer module 310, the accounting module 312 updates the balance of an intermediate account by communicating with the appropriate bank system 106 to obtain balance information.

In one embodiment, periodically for each intermediate account, the accounting module 312 updates the ideal fund range of the account in the intermediate storage 304. As described above, the ideal fund range of an intermediate account is a range within which the amount of funds of the account should be in order to be able to complete a majority of the inter-bank transfers requested by users.

As an example, the ideal fund range of an intermediate account may between $4,000 and $7,000. If the amount of funds stays within the range, the intermediate account will have enough funds to complete most inter-bank transfer requested by users that require withdrawing funds from the intermediate account. If the amount of funds of the account falls below the range for longer than a certain period of time, there is greater risk that the account will not have enough funds to complete inter-bank transfers requested by users. If the amount of funds is higher than the range, the account has more funds than needed which is a waste of resources.

To determine the ideal fund range of an account, an embodiment of the accounting module 312 uses a predictive model. The predictive model determines the ideal fund range based one or more of the following for a certain time period: the number of transfers to the account, the average value of a fund transfer to account, the number of transfers from the account, the average value of a fund transfer from the account, the amount of times that the intermediate account did not have sufficient funds for a transfer, and the number of user accounts with the bank maintaining the intermediate account. The accounting module 312 updates the intermediate storage 304 with the ideal fund range determined for the intermediate account based on the predictive model.

In one embodiment, the accounting module 312 monitors the balances of the intermediate accounts. If the balance of an intermediate account is below the ideal fund range of the account for longer than a certain period of time, the accounting module 312 communicates with a bank system 106 to transfer funds to the account (i.e., replenishes the account). In one embodiment, the funds are transferred to the intermediate account from another intermediate account whose balance is above its ideal fund range (i.e., from an intermediate account with surplus funds). In one embodiment, if there are no intermediate accounts with surplus funds, the accounting module 312 transfers funds to the intermediate account from a bank account that maintains a large balance for purposes of replenishing intermediate accounts.

The trust module 314 evaluates the trustworthiness of registered users. In one embodiment, for each registered user of the transfer management system 102, the trust module 314 maintains a trust score. A trust score of a user may be, for example, a number from 0 to 1, with 0 indicating least trustworthy and 1 indicating most trustworthy. In one embodiment, the trust score of a user is updated periodically (e.g., once a week) and/or when the user requests a funds transfer from the transfer management system 102. In one embodiment, the trust module 314 determines a trust score of a user based on one or more of the following factors: the amount of time the user has been registered with the transfer management system 102, how frequently the user requests fund transfers, the number of times the user failed to repay a debt after funds were loaned to the user by the transfer management system 102, and one or more credit scores of the user.

Figure 4:
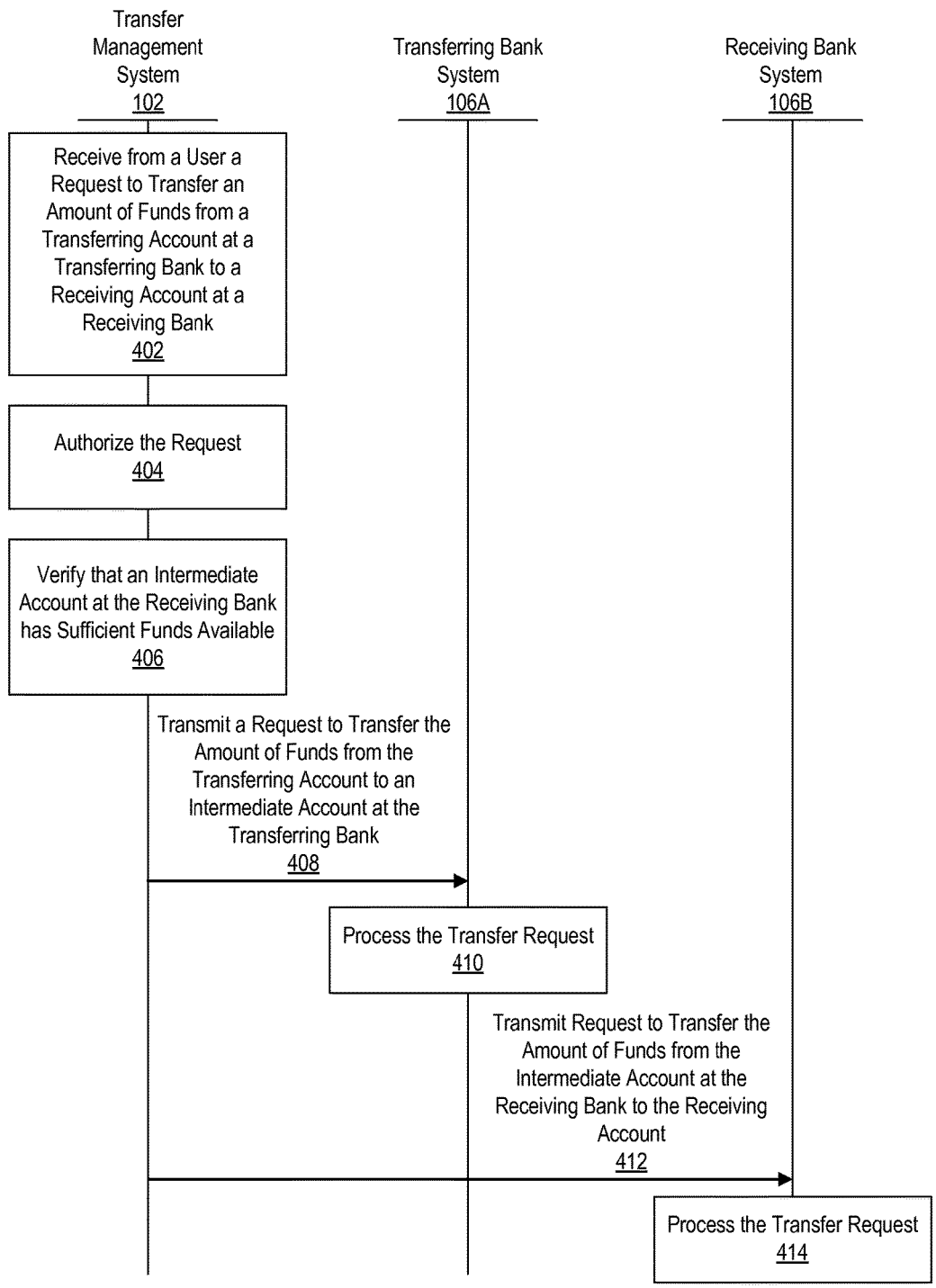
FIG. 4 is a sequence diagram illustrating processing a request to transfer funds from a transferring bank account to a receiving bank account, where each bank has an intermediate account according to one embodiment.

FIG. 4 is a sequence diagram illustrating processing a request to transfer funds from a transferring bank account at a transferring bank to a receiving bank account at a receiving bank, where each bank has an intermediate account. Assume for purposes of this example that bank system 106A is the electronic system of the transferring bank and bank system 106B is the electronic system of the receiving bank.

The transfer management system 102 receives 402 a request from a user to transfer an amount of funds from the transferring account to the receiving account. The transfer management system 102 authorizes 404 the request based on the account information being accurate, the user being authorized to make the request, and the transferring account having sufficient funds. Additionally, the transfer management system 102 verifies 406 that an intermediate account at the receiving bank has sufficient funds available to transfer the amount of funds to the receiving account.

The transfer management system 102 transmits 408 a request to the transferring bank system 106A to transfer the amounts of funds from the transferring account to an intermediate account at the transferring bank. The transferring bank system 106A processes 410 the transfer request from the transfer management system 102. The transfer management system 102 transmits 412 a request to the receiving bank system 106B to transfer the amount of funds from the intermediate account at the receiving bank to the receiving account. The receiving bank system 106B processes 414 the transfer request.

Figure 5:
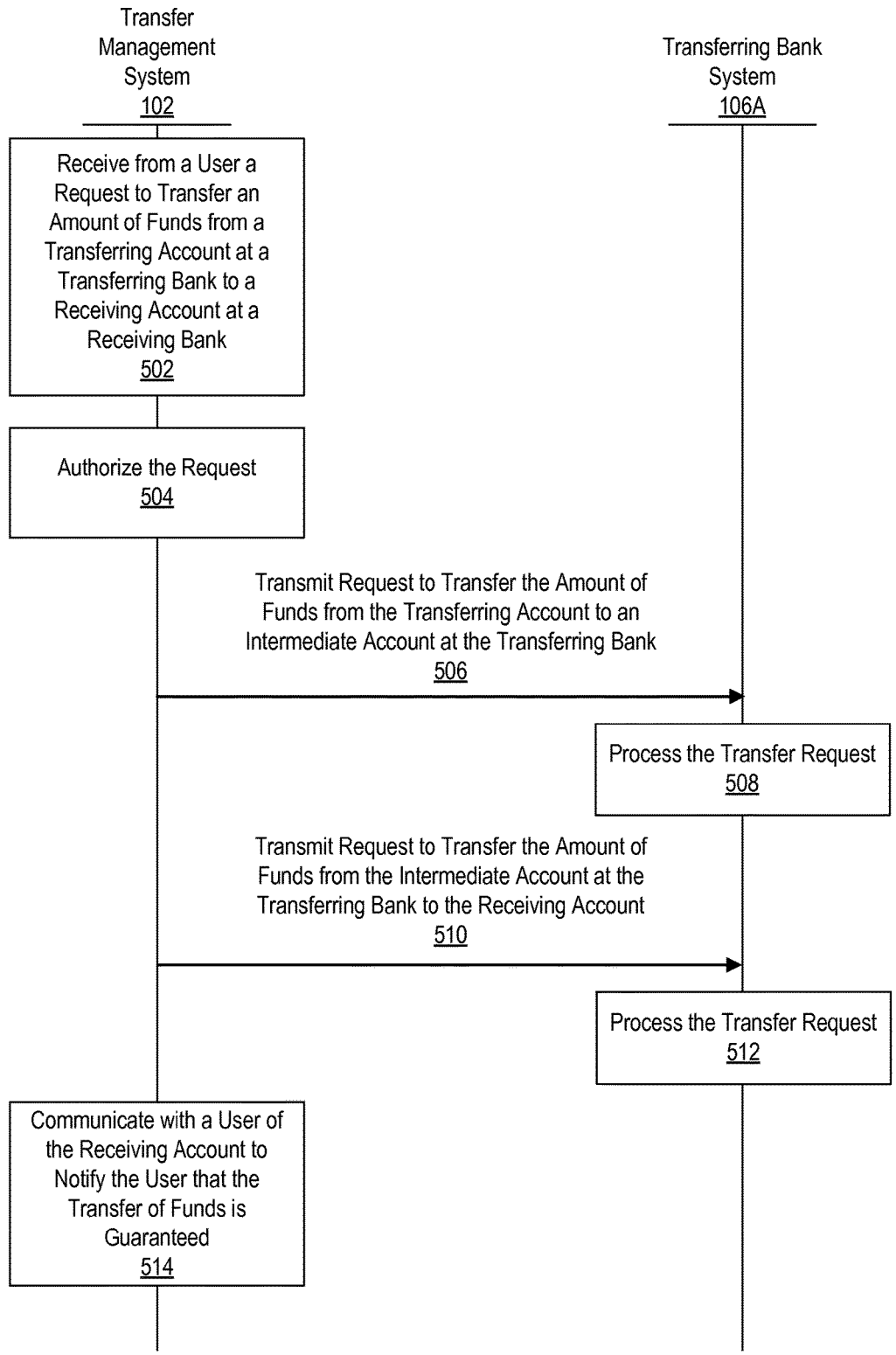
FIG. 5 is a sequence diagram illustrating processing a request to transfer funds from a transferring bank account with a transferring bank to a receiving bank account with a receiving bank, where the transferring bank has an intermediate account but the receiving bank does not have an intermediate account.

FIG. 5 is a sequence diagram illustrating processing a request to transfer funds from a transferring bank account at a transferring bank to a receiving bank account at a receiving bank, where the transferring bank has an intermediate account but the receiving bank does not have an intermediate account. Assume for purposes of this example that bank system 106A is the electronic system of the transferring bank.

The transfer management system 102 receives 502 a request from a user to transfer an amount of funds from the transferring account to the receiving account. The transfer management system 102 authorizes 504 the request based on the account information being accurate, the user being authorized to make the request, and the transferring account having sufficient funds. The transfer management system 102 transmits 506 a request to the transferring bank system 106A to transfer the amount of funds from the transferring account to the intermediate account at the transferring bank. The transferring bank system 106A processes 508 the transfer request from the transfer management system 102.

The transfer management system 102 transmits 510 a request to the transferring bank system 106A to transfer the amount of funds from the intermediate account at transferring bank to the receiving account. The transferring bank system 106A processes 512 the transfer request. The transfer management system 102 communicates 514 with a user of the receiving account to notify the user that the transfer of funds to the receiving account is guaranteed.

Figure 6:
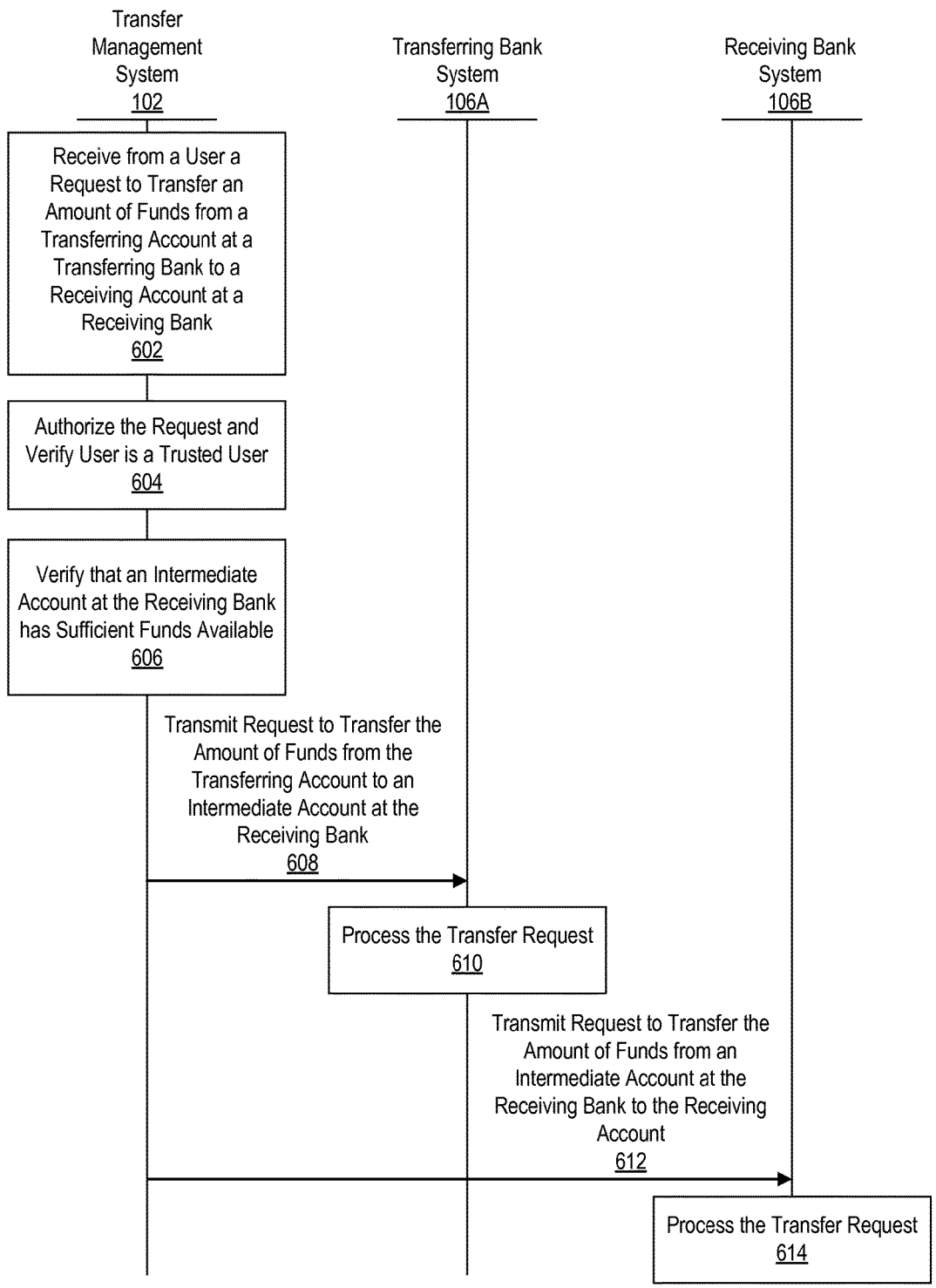
FIG. 6 is a sequence diagram illustrating processing a request to transfer funds from a transferring bank account with a transferring bank to a receiving bank account with a receiving bank, where the receiving bank has an intermediate account but the transferring bank does not have an intermediate account.

FIG. 6 is a sequence diagram illustrating processing a request to transfer funds from a transferring bank account at a transferring bank to a receiving bank account at a receiving bank, where the receiving bank has an intermediate account but the transferring bank does not have an intermediate account. Assume for purposes of this example that bank system 106A is the electronic system of the transferring bank and bank system 106B is the electronic system of the receiving bank.

The transfer management system 102 receives 602 a request from a user to transfer an amount of funds from the transferring account to the receiving account. The transfer management system 102 authorizes 604 the request and verifies that the user is a trusted user. Also, the transfer management system 102 verifies 606 that an intermediate account at the receiving bank has sufficient funds available to transfer the amount of funds to the receiving account.

The transfer management system 102 transmits 608 a request to the transferring bank system 106A to transfer the amount of funds from the transferring account to the intermediate account at the receiving bank. The transferring bank system 106A processes 610 the transfer request from the transfer management system 102. The transfer management system 102 transmits 612 a request to the receiving bank system 106B to transfer the amount of funds from the intermediate account at the receiving bank to the receiving account. The receiving bank system 106B processes 614 the transfer request.

Those of skill in the art will recognize that other embodiments can perform the steps of FIGS. 4, 5, and 6 in different orders. Moreover, other embodiments can include different and/or additional steps than the ones described.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The disclosure of the present invention is intended to be illustrative, but not limiting, of the full scope of the invention, which is set forth in the following claims.

The invention claimed is:

1. A computer-implemented method comprising:
receiving, by a transfer management computer system, a fund transfer request to transfer an amount of funds from a transferring account maintained by a transferring bank to a receiving account maintained by a receiving bank;
determining, by the transfer management computer system, that the transferring bank maintains a first intermediate account and that the receiving bank maintains a second intermediate account, the first intermediate account and the second intermediate account managed by an administrative entity independent from the transferring bank and the receiving bank;
responsive to determining that the transferring bank maintains the first intermediate account and the receiving bank maintains the second intermediate account, processing, by the transfer management computer system, the fund transfer request, via the Internet, without initiating a fund transfer between the first intermediate account and the second intermediate account, the transfer management computer system processing the fund transfer request by:
transmitting to a transferring bank system of the transferring bank, an Internet intra-bank transfer request to transfer the amount of funds from the transferring account to the first intermediate account maintained by the transferring bank; and
responsive to the first intermediate account receiving the funds from the transferring account, transmitting to a receiving bank system of the receiving bank, an Internet intra-bank transfer request to transfer the amount of funds from the second intermediate account maintained by the receiving bank to the receiving account; and
responsive to a balance of an intermediate account below an ideal fund range, initiating, by the transfer management system and as a replenishment, a transfer of funds to the intermediate account having a balance below the ideal fund range, wherein the ideal fund range is determined based on at least one of the following factors: a number of transfers to the intermediate account, an average fund transfer value to the intermediate account, a number of transfers from the intermediate account, an average fund transfer value from the intermediate account, and a number of user accounts with the bank maintaining the intermediate account.

2. The method of claim 1, further comprising:
determining whether the second intermediate account has sufficient funds to transfer the amount of funds to the receiving account;
responsive to determining that the second intermediate account does not have sufficient funds, inquiring at regular intervals whether the second intermediate account has sufficient funds; and
responsive to determining via an inquiry that the second intermediate account has sufficient funds, transmitting the request to the transferring bank system and the request to the receiving bank system.

3. The method of claim 1, further comprising:
responsive to a determination that the transferring bank maintains a first intermediate account but the receiving bank does not maintain a second intermediate account:
transmitting, by the transfer management computer system to the transferring bank system, an intra-bank transfer request to transfer the amount of funds from the transferring account to the first intermediate account; and
transmitting, by the transfer management computer system to the transferring bank system, an inter-bank transfer request to transfer the amount of funds from the first intermediate account to the receiving account.

4. The method of claim 3, wherein the request to transfer the amount of funds from the first intermediate account to the receiving account is transmitted responsive to the first intermediate account electronically receiving the amount of funds from the transferring account.

5. The method of claim 3, wherein responsive to the first intermediate account electronically receiving the amount of funds from the transferring account, a communication is transmitted to a user of the receiving account indicating that the administrative entity guarantees the user that the receiving account will receive the amount of funds according to the fund transfer request.

6. The method of claim 1, further comprising:
responsive to a determination that the receiving bank maintains a second intermediate account, that the transferring bank does not maintain a first intermediate account, and that a user that initiated the fund transfer request is trusted by the transfer management computer system:
transmitting, by the transfer management computer system to the transferring bank system, an inter-bank transfer request to transfer the amount of funds from the transferring account to the second intermediate account; and
transmitting, by the transfer management computer system to the receiving bank system, an intra-bank transfer request to transfer the amount of funds from the second intermediate account to the receiving account.

7. The method of claim 6, wherein a determination is made that the user is trusted responsive to a trust score determined for the user being above a threshold.

8. The method of claim 7, wherein the trust score for the user is determined based on one or more of the following factors: an amount of time the user has been registered with the transfer management computer system, how frequently the user requests fund transfers, a number of times the user failed to repay a debt after funds were loaned to the user for transferring funds to a receiving account, and one or more credit scores of the user.

9. The method of claim 1, further comprising:
responsive to a determination that the receiving bank maintains a second intermediate account, that the transferring bank does not maintain a first intermediate account, and that a user that initiated the fund transfer request is not trusted by the transfer management computer system, transmitting, by the transfer management computer system to the transferring bank system, an inter-bank transfer request to transfer the amount of funds from the transferring account to the receiving bank.

10. A computer program product comprising a non-transitory computer-readable storage device having computer-executable program instructions embodied thereon that when executed by a computer cause the computer to:
receive a fund transfer request to transfer an amount of funds from a transferring account maintained by a transferring bank to a receiving account maintained by a receiving bank;
determine that the transferring bank maintains a first intermediate account and that the receiving bank maintains a second intermediate account, the first intermediate account and the second intermediate account managed by an administrative entity independent from the transferring bank and the receiving bank; and
responsive to determining that the transferring bank maintains the first intermediate account and the receiving bank maintains the second intermediate account, process the fund transfer request, via the Internet, without initiating a fund transfer between the first intermediate account and the second intermediate account, the fund transfer request processed by:
transmitting to a transferring bank system of the transferring bank, an Internet intra-bank transfer request to transfer the amount of funds from the transferring account to the first intermediate account maintained by the transferring bank; and
responsive to the first intermediate account receiving the funds from the transferring account, transmitting to a receiving bank system of the receiving bank, an Internet intra-bank transfer request to transfer the amount of funds from the second intermediate account maintained by the receiving bank to the receiving account; and
responsive to a balance of an intermediate account below an ideal fund range, initiate, by the transfer management system and as a replenishment, a transfer of funds to the intermediate account having a balance below the ideal fund range, wherein the ideal fund range is determined based on at least one of the following factors: an average fund transfer value to the intermediate account, a number of transfers from the intermediate account, an average fund transfer value from the intermediate account, and a number of user accounts with the bank maintaining the intermediate account.

11. The computer program product of claim 10, wherein the computer-executable program instructions further comprise computer-executable program instructions, responsive to a determination that the transferring bank maintains a first intermediate account but the receiving bank does not maintain a second intermediate account:
to transmit to the transferring bank system, an intra-bank transfer request to transfer the amount of funds from the transferring account to the first intermediate account; and
to transmit to the transferring bank system, an inter-bank transfer request to transfer the amount of funds from the first intermediate account to the receiving account.

12. The computer program product of claim 10, wherein the computer-executable program instructions further comprise computer-executable program instructions, responsive to a determination that the receiving bank maintains a second intermediate account, that the transferring bank does not maintain a first intermediate account, and that a user that initiated the fund transfer request is trusted by the transfer management computer system:
to transmit to the transferring bank system, an inter-bank transfer request to transfer the amount of funds from the transferring account to the second intermediate account; and
to transmit to the receiving bank system, an intra-bank transfer request to transfer the amount of funds from the second intermediate account to the receiving account.

13. A system comprising:
a non-transitory computer-readable storage media; and
a processor communicatively coupled to the storage media, wherein the processor executes application code instructions that are stored in the storage media to cause the system to:
receive a fund transfer request to transfer an amount of funds from a transferring account maintained by a transferring bank to a receiving account maintained by a receiving bank;
determine that the transferring bank maintains a first intermediate account and that the receiving bank maintains a second intermediate account, the first intermediate account and the second intermediate account managed by an administrative entity independent from the transferring bank and the receiving bank; and responsive to determining that the transferring bank maintain the first intermediate account and the receiving bank maintains the second intermediate account, process the fund transfer request via the Internet without initiating a fund transfer between the first intermediate account and the second intermediate account, the fund transfer request processed by:

- transmitting to a transferring bank system of the transferring bank, an Internet intra-bank transfer request to transfer the amount of funds from the transferring account to the first intermediate account maintained by the transferring bank; and
- responsive to the first intermediate account receiving the funds from the transferring account, transmitting to a receiving bank system of the receiving bank, an Internet intra-bank transfer request to transfer the amount of funds from the second intermediate account maintained by the receiving bank to the receiving account; and responsive to a balance of an intermediate account below an ideal fund range, initiate, by the transfer management system and as a replenishment, a transfer of funds to the intermediate account having a balance below the ideal fund range, wherein the ideal fund range is determined based on at least one of the following factors: a number of transfers to the intermediate account, an average fund transfer value to the intermediate account, a number of transfers from the intermediate account, an average fund transfer value from the intermediate account, and a number of user accounts with the bank maintaining the intermediate account.

14. The system of claim 13, wherein the processor further executes application code instructions that are stored in the storage media to cause the system to, responsive to a determination that the transferring bank maintains a first intermediate account but the receiving bank does not maintain a second intermediate account:

- transmit to the transferring bank system, an intra-bank transfer request to transfer the amount of funds from the transferring account to the first intermediate account; and
- transmit to the transferring bank system, an inter-bank transfer request to transfer the amount of funds from the first intermediate account to the receiving account.

15. The system of claim 13, wherein the processor further executes application code instructions that are stored in the storage media to cause the system to, responsive to a determination that the receiving bank maintains a second intermediate account, that the transferring bank does not maintain a first intermediate account, and that a user that initiated the fund transfer request is trusted by the transfer management computer system:

- transmit to the transferring bank system, an inter-bank transfer request to transfer the amount of funds from the transferring account to the second intermediate account; and
- transmit to the receiving bank system, an intra-bank transfer request to transfer the amount of funds from the second intermediate account to the receiving account.

16. The method of claim 1, wherein the replenishment is from a replenishing intermediate account having a balance above the ideal fund range of the replenishing intermediate account.

* * * * *